R. ELY.
Nut-Lock.
No. 204,014.            Patented May 21, 1878.
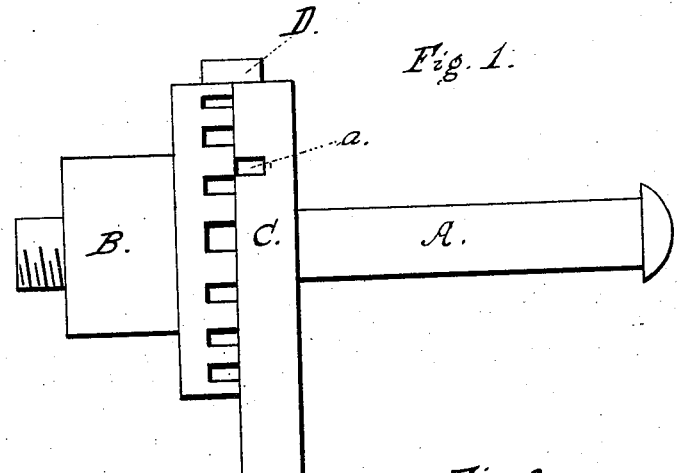
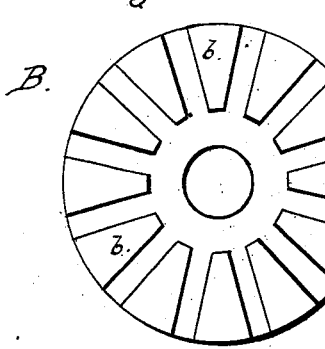
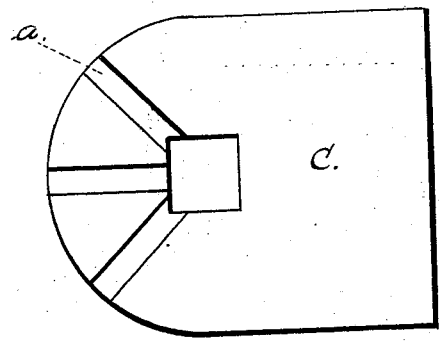
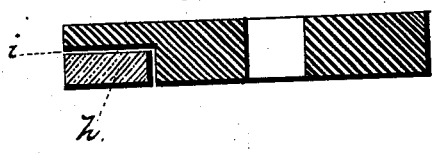
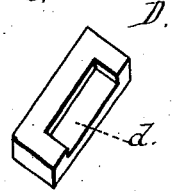
WITNESSES
Jno. F. Blackmar.
Everett A. Bates.
INVENTOR
Ralph Ely.
Gilmore Smith & Co.
ATTORNEYS.

UNITED STATES PATENT OFFICE.

RALPH ELY, OF DAVISBURG, MICHIGAN.

IMPROVEMENT IN NUT-LOCKS.

Specification forming part of Letters Patent No. 204,014, dated May 21, 1878; application filed March 23, 1878.

*To all whom it may concern:*

Be it known that I, RALPH ELY, of Davisburg, in the county of Oakland and State of Michigan, have invented a new and valuable Improvement in Nut-Locks; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my nut-lock. Fig. 2 is a bottom-plan view of the nut. Fig. 3 is a plan view of the washer. Fig. 4 is a longitudinal vertical section of the washer, and Fig. 5 is a perspective view of the key.

My invention relates to devices for fastening nuts so that they will not work loose by jarring, &c.; and the nature of my invention consists in the construction of the nut, the washer, and a key used for locking the two together, all as hereinafter more fully set forth, and pointed out in the claim.

The annexed drawing, to which reference is made, fully illustrates my invention.

A represents an ordinary bolt, with nut B screwed on the end thereof. C is a washer, interposed between the nut B and the article through which the bolt passes.

The nut B is, on its inner face, formed with a series of V-shaped projections, $b$, arranged in a concentric circle and extending from the outer edge inward for a suitable distance, said projections forming parallel walled radial grooves, as shown, at equal distances apart.

In the outer face of the washer are made one, two, or more grooves, $a\ a$, extending from the outer edge inward to the bolt-hole.

After the nut has been screwed upon the bolt tightly against the washer, and placed in such a manner that one of the grooves $a$ will coincide with one of the grooves formed by the projections $b$, a key, D, is inserted in the same, thus locking the nut to the washer. This key D is formed on one side with a recess, $d$, so that when the key has been inserted the nut will be started back slightly, which causes one of the projections $b$ to enter said recess $d$ in the key, thereby fastening the key securely, leaving the nut fast until a wrench is used to start the nut on, which will allow of the key being removed, when the nut can be unscrewed.

In the inner face of the washer is made a recess, $i$, in which is placed a rubber block, $h$. When the nut B is screwed up tightly this rubber block is compressed, which creates sufficient friction so that the washer will not turn.

In railroad-rail joints the washer may be extended downward to rest on the foot of the rail, and thereby prevent the turning of the washer.

What I claim as new, and desire to secure by Letters Patent, is—

The key D, provided with the recess $d$, in combination with nut B, having on its inner face a series of radial projections, $b$, and washer C, as and for the purposes set forth.

In testimony that I claim the above I have hereunto subscribed my name in the presence of two witnesses.

RALPH ELY.

Witnesses:
　EDMUND ELY,
　GIDEON R. GRANGER.